US008386318B2

(12) United States Patent
Varadarajan et al.

(10) Patent No.: US 8,386,318 B2
(45) Date of Patent: Feb. 26, 2013

(54) SYSTEM AND METHOD FOR SUPPORTING PEER INTERACTIONS

(75) Inventors: Sridhar Varadarajan, Bangalore (IN); Srividya Gopalan, Bangalore (IN)

(73) Assignee: Satyam Computer Services Ltd., Secunderabad (IN)

( * ) Notice: Subject to any disclaimer, the term of this patent is extended or adjusted under 35 U.S.C. 154(b) by 933 days.

(21) Appl. No.: 12/346,167

(22) Filed: Dec. 30, 2008

(65) Prior Publication Data

US 2010/0167709 A1 Jul. 1, 2010

(51) Int. Cl.
*G06Q 30/00* (2012.01)
(52) U.S. Cl. .................................................. 705/14.64
(58) Field of Classification Search ............... 705/14.64; 455/518, 519
See application file for complete search history.

(56) References Cited

U.S. PATENT DOCUMENTS

| | | | | |
|---|---|---|---|---|
| 6,999,783 | B2 * | 2/2006 | Toyryla et al. ................ | 455/519 |
| 7,143,075 | B1 | 11/2006 | Chickering et al. | |
| 7,159,784 | B2 | 1/2007 | Lapstun et al. | |
| 7,170,863 | B1 * | 1/2007 | Denman et al. ............... | 370/260 |
| 7,307,997 | B2 * | 12/2007 | Vinokurov et al. ........... | 370/401 |
| 7,366,897 | B2 * | 4/2008 | Noble ........................... | 713/156 |
| 7,526,306 | B2 * | 4/2009 | Brems et al. .................. | 455/518 |
| 7,865,830 | B2 * | 1/2011 | Kim et al. ...................... | 715/713 |
| 7,904,062 | B2 * | 3/2011 | Ashkenazi et al. ........ | 455/414.1 |
| 2003/0078064 | A1 * | 4/2003 | Chan .............................. | 455/514 |
| 2004/0030597 | A1 * | 2/2004 | Bibas ............................. | 705/14 |
| 2004/0058698 | A1 * | 3/2004 | Crockett et al. .............. | 455/518 |
| 2004/0266468 | A1 * | 12/2004 | Brown et al. .................. | 455/518 |
| 2005/0032539 | A1 * | 2/2005 | Noel et al. ..................... | 455/518 |
| 2005/0113122 | A1 * | 5/2005 | Korneluk ...................... | 455/518 |
| 2005/0289131 | A1 * | 12/2005 | Aenlle et al. ..................... | 707/3 |
| 2006/0026242 | A1 * | 2/2006 | Kuhlmann et al. ........... | 709/206 |
| 2006/0095320 | A1 * | 5/2006 | Jones .............................. | 705/14 |
| 2007/0005683 | A1 * | 1/2007 | Omidyar ....................... | 709/203 |
| 2007/0067405 | A1 * | 3/2007 | Eliovson ....................... | 709/206 |
| 2007/0076853 | A1 * | 4/2007 | Kurapati et al. ............. | 379/1.01 |
| 2007/0099701 | A1 | 5/2007 | Simon et al. | |
| 2008/0005011 | A1 * | 1/2008 | Meek et al. ..................... | 705/37 |

(Continued)

OTHER PUBLICATIONS

Heechang et al., "A Profile Anonymization Model for Privacy in a Personalized Location Based Service Environment", Mobile Data Management, Apr. 2008, pp. 73-80, Beijing.

(Continued)

*Primary Examiner* — John Weiss
*Assistant Examiner* — Bennett Sigmond
(74) *Attorney, Agent, or Firm* — The Webb Law Firm

(57) ABSTRACT

Peer to peer interactions are a popular way of social networking. Such peer to peer interactions play an important role in (a) obtaining relevant and latest information; (b) obtaining relevant experiential information; (c) obtaining of relevant opinions on, say, products; (d) collaborative problem solving, and so on. Consider a scenario of classified ads: a user visiting a portal through a mobile phone to decide on buying of a product can be well assisted by facilitating peer to peer interactions. In many situations, it is required to make the right selection of peers in order to be able to obtain the right information, and furthermore, voice is a preferred mode of interaction if mobile phones are used in peer to peer interactions. Also, in peer to peer interactions, anonymity is important in order to protect the privacy of the peers. A system and method for supporting peer interactions, especially in a mobile scenario involving classified ads, need to address the issues related to (a) selecting and displaying of the right information; (b) selecting of right peers; and (c) facilitating anonymous peer interactions.

6 Claims, 11 Drawing Sheets

An Illustrative Ad Display

U.S. PATENT DOCUMENTS

| | | | |
|---|---|---|---|
| 2008/0040216 | A1 | 2/2008 | Dellovo et al. |
| 2008/0103887 | A1* | 5/2008 | Oldham et al. ............... 705/14 |
| 2009/0006469 | A1* | 1/2009 | Jain et al. ............... 707/104.1 |
| 2009/0172730 | A1* | 7/2009 | Schiff et al. ............... 725/34 |
| 2010/0223111 | A1* | 9/2010 | Maekawa ............... 705/14.4 |
| 2011/0041168 | A1* | 2/2011 | Murray et al. ............... 726/7 |

OTHER PUBLICATIONS

Adamopoulou et al., "Introducing Anonymous Real-Time Mobile Community Services", Mobile and Wireless Communications Summit, Jul. 2007, pp. 105.

Demestichas et al., "Towards Anonymous Mobile Community Services", Natl.Tech. Univ. of Athens, Apr. 2008, Athens, Greece.

Gulyas et al., "Comprehensive Analysis of Web Privacy and Anonymous Web Browsers: Are Next Generation Services Based on Collaborative Filtering?", Budapest Univ. of Tech. and Economics, Budapest, Hungary.

Claessens et al., "A Secure and Privacy-Preserving Web Banner System for Targeted Advertising", (COSIC), Aug. 2003, Leuven, Belgium.

* cited by examiner

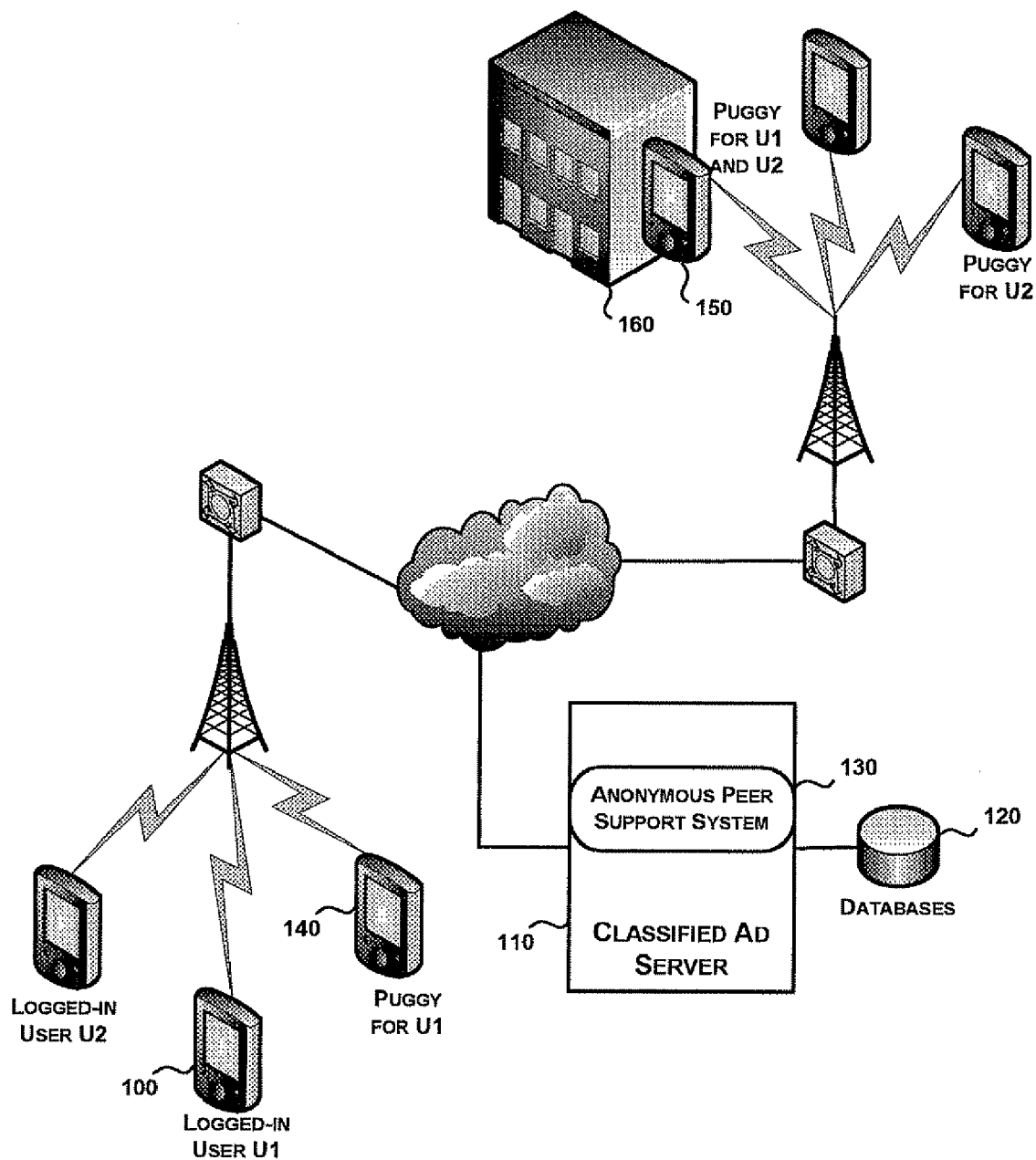
FIG. 1: A TYPICAL MOBILE/CLASSIFIED AD SCENARIO

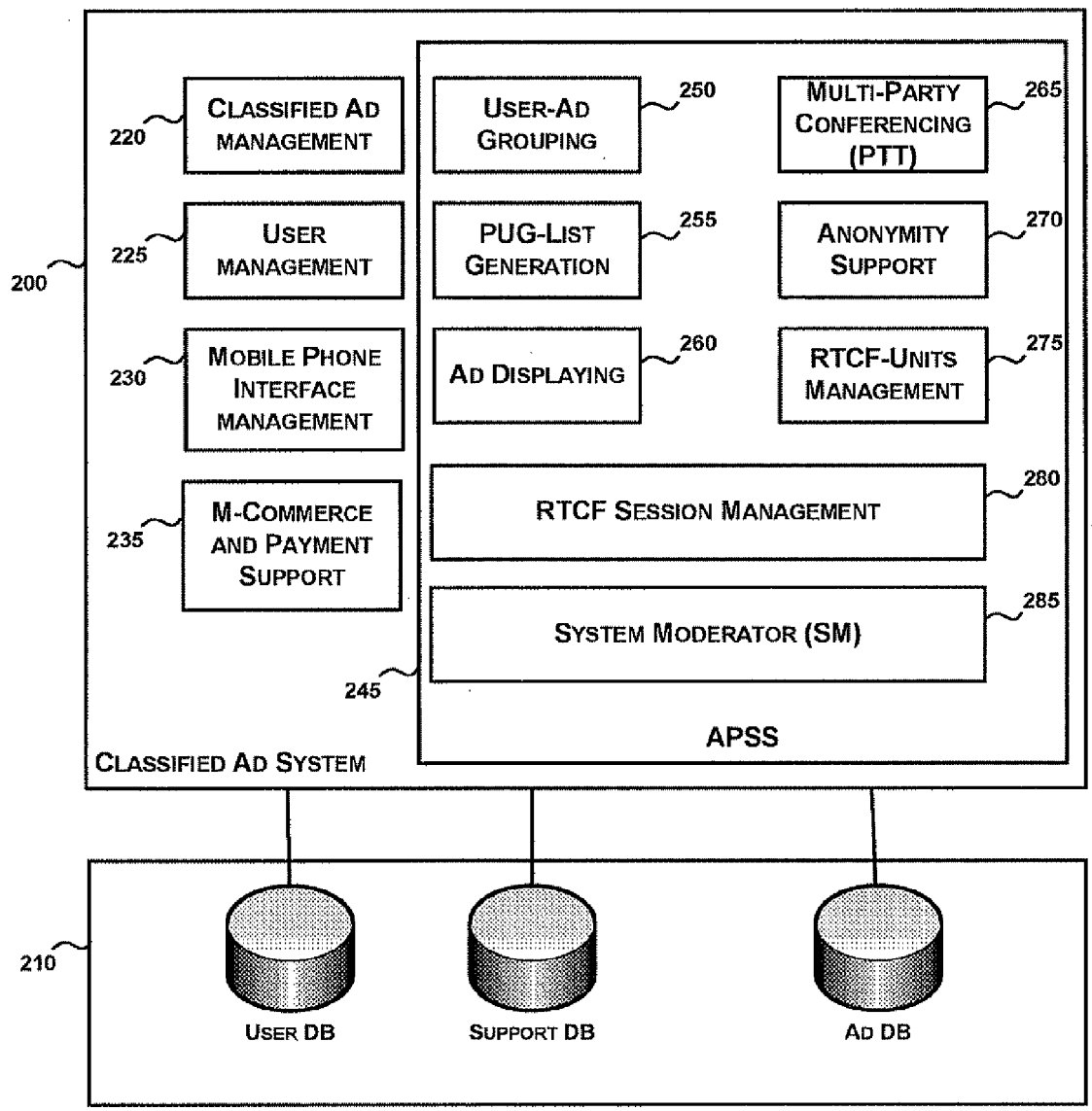
FIG. 2: AN OVERVIEW OF ANONYMOUS PEER SUPPORT SYSTEM (APSS)

AD DESCRIPTION
   EACH AD IS ABOUT A PRODUCT OR BRAND;
   ADS ARE DESCRIBED USING A SET OF KEY-ATOMIC CONCEPTS;
   EACH AD HAS DETAILS ABOUT WHO ALL HAVE SHOWN INTEREST THROUGH CLICKING;
   LET A BE AN AD; DA IS A SET OF KEY-ATOMIC CONCEPTS PROVIDING THE DESCRIPTION OF A;
   LET SUA BE A SET OF USERS WHO HAVE SHOWN INTEREST IN A;
   LET CS BE A SET OF CORPORATE SALES STAFF INFORMATION FOR EACH AD FOR
   PARTICIPATING IN RTCF SESSIONS;

USER DESCRIPTION
   USERS VISIT THE CLASSIFIED ADS PORTAL IN ORDER TO KNOW ABOUT THE PRODUCTS BEING
   ADVERTISED;
   USERS VISIT THE PORTAL SEVERAL TIMES, CLICK ON MULTIPLE ADS MULTIPLE TIMES;
   USERS ALSO PARTICIPATE IN SEVERAL REAL-TIME CONVERSATIONAL FEEDBACK SESSIONS;
   USER DATA INCLUDES THE FOLLOWING:
      WITH RESPECT TO AN AD A
         NUMBER OF CLICKS (NC);
         FREQUENCY OF CLICKS (FC); NOTE THAT FC IS RELATED TO TIME INTERVAL BETWEEN
            CLICKS;
         NUMBER OF RTCFs INITIATED (NI);
         NUMBER OF RTCFs PARTICIPATED (NP);
         TOTAL PARTICIPATION TIME (TT);
         BOUGHT STATUS (BS);
   NUMBER OF PRODUCTS BOUGHT (NB);
   RTCF UNITS (RU);
   REWARD POINTS;
   NUMBER OF FORCED OUTS (FO);

FIG. 3: A BRIEF DESCRIPTION OF ADS AND USERS

USER GROUPING:
OBJECTIVE:
  CREATE USER GROUPS BASED ON THEIR CLICK BEHAVIOR WITH RESPECT TO ADS;

INPUT: SU – A SET OF USERS; OUTPUT: GSU – A SET OF GROUPS OF USERS;

FOR EACH USER U IN SU,
  OBTAIN UA, THE SET OF ADS CLICKED BY U;
FOR EACH USER U1 IN SU,
  DETERMINE A GROUP G IN GSU WHOSE DISTANCE WITH U IS MINIMUM AS COMPARED WITH
  THE OTHER GROUPS IN GSU AND IS LESS THAN A PRE-DEFINED THRESOLD;
  IF SUCH A GROUP G CAN BE FOUND, MAKE U1 A PART OF G AND UPDATE G;
  OTHERWISE, CREATE A NEW GROUP G, MAKE U1 A PART OF G, MAKE G A PART OF GSU,
  AND UPDATE G;

A WAY TO UPDATE G WITH U WOULD BE TO ADD UA TO GA WHEREIN G IS A SET OF USERS AND
  THE ASSOCIATED GA IS THE SET OF ADS BASED ON USERS IN G;
A WAY TO MEASURE DISTANCE BETWEEN U AND G WOULD BE BASED ON THE INTERSECTION
  BETWEEN UA AND GA;

FIG. 4: AN APPROACH FOR USER GROUP GENERATION

---

AD GROUPING (GENERIC):
OBJECTIVE:
  CREATE AD GROUPS THAT ARE USED TO DISPLAY THE ADS TO A FIRST TIME USER OR TO A
  USER WHO HAS NO OPEN ADS (AN OPEN AD IS AN AD THAT HAS BEEN CLICKED BY A USER
  AND HAS NOT YET BEEN CLOSED)

INPUT: SA – A SET OF ADS; OUTPUT: GSA – A SET OF GROUPS OF ADS (GENERIC AD GROUPS);

STEP 1: SELECT AN AD AI FROM SA; SET SAI' EMPTY;
STEP 2: LET UAI BE THE SET OF USERS WHO HAVE SHOWN INTEREST IN AI;
  TYPICALLY, "SHOWN INTEREST" IS BASED ON CLICK PATTERN ANALYSIS WHEREIN, THE USERS'
  CLICKS RELATED TO AN AD ARE ANALYZED FOR THE ASPECTS SUCH AS NUMBER OF CLICKS
  AND FREQUENCY OF CLICKS;STEP 3: FOR EACH USER U IN UAI,
        OBTAIN ADS CLICKED BY U;
        FILTER THESE ADS BASED ON FREQUENCY OF CLICKS TO IDENTIFY SA1';
        IF SAI' IS EMPTY, SAI' = SA1';
        ELSE SAI' = INTERSECTION OF SAI' AND SA1';
STEP 4: MAKE AI PART OF SAI'; MAKE SAI' A PART OF GSA; REMOVE SAI' FROM SA;
STEP 5: REPEAT FROM STEP 1 UNTIL SA IS EMPTY;

FIG. 5: AN APPROACH FOR AD GROUP GENERATION - 1

AD GROUPING (META-DESCRIPTION):
OBJECTIVE:
   GROUP ADS BASED ON THEIR META-DESCRIPTION SO AS TO BE ABLE TO IDENTIFY SIMILAR ADS;
INPUT: SA – A SET OF ADS; OUTPUT: DGSA – A SET OF META AD GROUPS

STEP 1: SELECT AN AD A FROM SA;
STEP 2: DETERMINE A GROUP G IN DGSA WHOSE DISTANCE WITH A IS MINIMUM AS COMPARED WITH THE OTHER GROUPS IN DGSA AND IS LESS THAN A PRE-DEFINED THRESHOLD;
STEP 3: IF SUCH A GROUP CAN BE FOUND, MAKE A PART OF THE G AND UPDATE G;
STEP 4: OTHERWISE, CREATE A NEW GROUP G WITH A AS ITS ELEMENT, MAKE G A PART OF DGSA, AND UPDATE G;
STEP 5: REPEAT FROM STEP 1 UNTIL ALL ELEMENTS OF SA ARE SELECTED;

A WAY TO UPDATE G WITH A WOULD BE OBTAIN THE META-DESCRIPTION OF A AND META-DESCRIPTION OF G, AND COMBINE THEM BASED ON TERM-FREQUENCY ANALYSIS;
A WAY TO COMPUTE DISTANCE BETWEEN A AND G WOULD BE OBTAIN THE INTERSECTION OF THE META-DESCRIPTION OF A AND META-DESCRIPTION OF G;

FIG. 5A: AN APPROACH FOR AD GROUP GENERATION - 2

AD GROUPING (A USER AND AN AD);
OBJECTIVE:
   TO IDENTIFY A SET OF ADS BASED ON A USER AND AN AD TO GENERATE CUSTOM AD GROUPS;

INPUT: USER U AND AD A CLICKED BY U;
OUTPUT: CUSTOM-SPECIFIC AD GROUPING;

OBTAIN THE SET OF ADS SSA THAT ARE SIMILAR TO A; SSA BELONGS TO DGSA;
OBTAIN THE SET OF USERS SSU THAT ARE SIMILAR TO U; SSU BELONGS TO GSU;
OBTAIN THE SET OF ADS SOA THAT ARE ALSO CLICKED BY U;

SSA PROVIDES ADS THAT ARE MOST SIMILAR TO A;
ORDER SSA ON HITS AND RECENCY;

SSU PROVIDES USERS THAT ARE MOST SIMILAR TO U;
FOR EACH USER U IN SU,
   OBTAIN THE MOST RECENT AND MOST CLICKED ADS RELATED TO U;
   MAKE THESE ADS A PART OF SSUA;
ORDER SSUA ON HITS AND RECENCY;

ORDER SOA BASED ON HITS AND RECENCY;

FIG. 5B: AN APPROACH FOR AD GROUP GENERATION - 3

AD DISPLAY ON USER LOGIN; INPUT-LOGGED IN USER U; OUTPUT-DISPLAY STRUCTURE OF ADS

CASE: U WITH OPEN ADS
   LET A BE THE AD LAST CLICKED BY U THAT IS STILL OPEN;
   OBTAIN THE SETS SSA, SSUA, AND SOA;
   OBTAIN THE SCREEN DIMENSION;
   DETERMINE R THE NUMBER OF RADIAL STRUCTURES POSSIBLE;
   PUT A AT THE CENTER OF THE SCREEN;
   REMOVE ADS THAT ARE CLOSED WITH RESPECT TO U FROM SSA, SSUA, AND SOA;
   FOR EACH RADIAL STRUCTURE UNTIL R,
      DIVIDE THE NEXT RADIAL SURFACE INTO THREE PORTIONS, RA, RUA, AND ROA, BASED ON THE RELATIVE SIZES OF SSA, SSUA, AND SOA;
      BASED ON THE SIZE OF RA, SELECT TOP ADS FROM SSA, AND POPULATE RA;
      BASED ON THE SIZE OF RUA, SELECT TOP ADS FROM SSUA, AND POPULATE RUA;
      BASED ON THE SIZE OF ROA, SELECT TOP ADS FROM SOA, AND POPULATE ROA;
   DISPLAY ON A MOBILE PHONE USING THE DISPLAY STRUCTURE 1;

CASE: U WITH NO OPEN ADS
   BASED ON GSU, DETERMINE THE GROUP G OF U;
   FOR EACH GA IN GSA,
      OBTAIN THE SET OF USERS SX WHO ARE PART OF ADS IN GA; NOTE THAT THIS IS BASED ON USERS WHO HAVE SHOWN INTEREST IN AN AD IN GA;
      DETERMINE THE OVERLAP FACTOR OF GA BASED ON INTERSECTION BETWEEN SX AND G;
   SELECT GA WITH THE MAXIMUM OVERLAP FACTOR;
   REMOVE ADS THAT ARE CLOSED WITH RESPECT TO U;
   ORDER GA ON HITS AND RECENCY;
   OBTAIN THE SCREEN DIMENSION;
   DETERMINE R THE NUMBER OF RADIAL STRUCTURES POSSIBLE;
   SELECT A THAT IS AT THE TOP OF GA AND PUT A AT THE CENTER OF THE SCREEN;
   FOR EACH RADIAL STRUCTURE UNTIL R,
      OBTAIN THE NUMBER OF ADS N THAT CAN BE DISPLAYED;
      SELECT N ADS FROM GA AND POPULATE RA;
   DISPLAY ON A MOBILE PHONE USING THE DISPLAY STRUCTURE 2;

CASE: U IS A FIRST TIME USER
   FOR EACH GA IN GSA,
      DETERMINE A POPULARITY FACTOR BASED ON HITS AND RECENCY OF ADS IN GA;
   SELECT GA WITH THE MAXIMUM POPULARITY FACTOR;
   ORDER GA ON HITS AND RECENCY;
   OBTAIN THE SCREEN DIMENSION;
   DETERMINE R THE NUMBER OF RADIAL STRUCTURES POSSIBLE;
   SELECT A THAT IS AT THE TOP OF GA AND PUT A AT THE CENTER OF THE SCREEN;
   FOR EACH RADIAL STRUCTURE UNTIL R,
      OBTAIN THE NUMBER OF ADS N THAT CAN BE DISPLAY;
      SELECT N ADS FROM GA AND POPULATE RA;
   DISPLAY ON A MOBILE PHONE USING THE DISPLAY STRUCTURE 3;

FIG. 6: AN APPROACH FOR AD DISPLAY

AD DISPLAY (CONTD.)
COMMON ACROSS ALL THE THREE CASES:
FOR EACH GA IN GSA,
  DETERMINE A POPULARITY FACTOR BASED ON HITS AND RECENCY OF ADS IN GA;
FOR EACH GA OBTAINED IN THE ORDER OF POPULARITY FACTOR
  REMOVE ADS THAT ARE EITHER CLOSED WITH RESPECT TO U OR ALREADY DISPLAYED;
  MAKE THE REMAINING ADS A PART OF THE RESERVE DISPLAY STRUCTURE;
DEPENDING ON THE SCROLL DIRECTION,
  REMOVE AN APPROPRIATE RADIAL STRUCTURE FROM DISPLAY;
  REPOSITION AND DISPLAY THE REMAINING RADIAL STRUCTURES;
  FILL THE NEXT RADIAL STRUCTURE USING EITHER DISPLAY STRUCTURE 1, DISPLAY STRUCTURE 2, DISPLAY STRUCTURE 3, OR RESERVE DISPLAY STRUCTURE;
  DISPLAY THE ADS FROM THE NEXT RADIAL STRUCTURE;

FIG. 6A: AN APPROACH FOR AD DISPLAY (CONTD.)

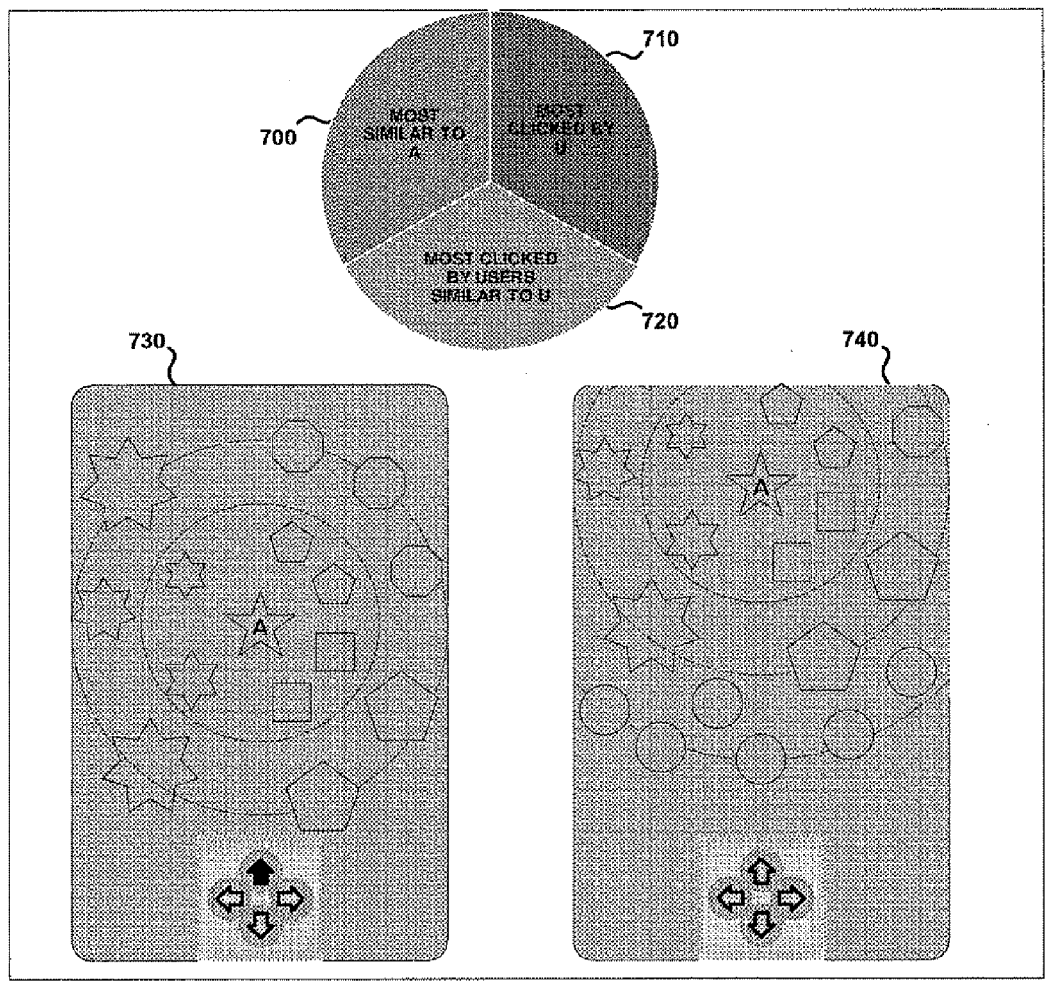

FIG. 7: AN ILLUSTRATIVE AD DISPLAY

PUG LIST FORMATION
OBJECTIVE: FOR EACH AD, CREATE A PEER USER GROUP WHO COULD PROVIDE SUPPORT FOR
HELPING A USER TO TAKE A DECISION ON A PRODUCT ENDORSED BY AD A; THE PEER USER
GROUP MEMBERS ARE ALSO CALLED AS PUGGYS.

INPUT: AN AD A; OUTPUT: $PUG_A$ – LIST OF USERS RELATED TO A;

OBTAIN FOR EACH USER U THE FOLLOWING:
  WITH RESPECT TO A, OBTAIN NUMBER OF CLICKS (NC), FREQUENCY OF CLICKS (FC),
  NUMBER OF RTCFS INITIATED (NI), NUMBER OF RTCFS PARTICIPATED (NP), TOTAL
  PARTICIPATION TIME (TT); NOTE THAT FC IS RELATED TO TIME INTERVAL BETWEEN CLICKS;
  OBTAIN NUMBER OF PRODUCTS BOUGHT (NB), BOUGHT STATUS (BS) WITH RESPECT TO A,
  RTCF UNITS (RU), REWARD POINTS, AND NUMBER OF FORCED OUTS (FO);

OBTAIN MIN AND MAX BOUNDS ON $PUG_A$;
OBTAIN NUMBER OF CS WITH RESPECT TO A;

LET W1 BE THE WEIGHT ASSOCIATED WITH NC, W2 WITH FC, W3 IN NI, W4 WITH NP, W5 WITH
TT, W6 WITH NB, AND W7 WITH RU;

ACROSS ALL USERS, OBTAIN MAX-NC AND MIN-NC, MAX-FC AND MIN-FC, MAX-NI AND MIN-NI,
MAX-NP AND MIN-NP, MAX-TT AND MIN-TT, MAX-NB AND MIN-NB, MAX-RU AND MIN-RU;

FOR EACH USER U,
  COMPUTE UR AS   (W1 *(NC – MIN-NC)/(MAX-NC – MIN-NC)) +
                  (W2 *(FC – MIN-FC)/(MAX-FC – MIN-FC)) +
                  (W3 *(NI – MIN-NI)/(MAX-NI – MIN-NI)) +
                  (W4 *(NP – MIN-NP)/(MAX-NP – MIN-NP)) +
                  (W5 *(TT – MIN-TT)/(MAX-TT – MIN-TT)) +
                  (W6 *(NB – MIN-NB)/(MAX-NB – MIN-NB)) +
                  (W7 *(RU – MIN-RU)/(MAX-RU – MIN-RU));
RANK USERS ON THEIR RATING UR;
SELECT A PRE-DEFINED NUMBER OF USERS THAT IS LESS THAN MAX, WITH EACH SELECTED USER
    SATISFYING THE FOLLOWING:
  IF RANK < A PRE-DEFINED FIRST THRESHOLD AND FO > A PRE-DEFINED THRESHOLD, USER IS
    NOT SELECTED;
  IF RANK < A PRE-DEFINED SECOND THRESHOLD AND BS IS TRUE, USER IS SELECTED;
  REMAINING NUMBER OF USERS IS SELECTED FROM THE TOP OF THE RANKED USERS;
IF NUMBER OF USERS IS < MIN, THEN ADD RANDOMLY SELECTED USERS;
DEPENDING ON THE POLICY, ADD APPROPRIATE NUMBER OF CS STAFF;

FIG. 8: AN APPROACH FOR PEER USER GROUP GENERATION

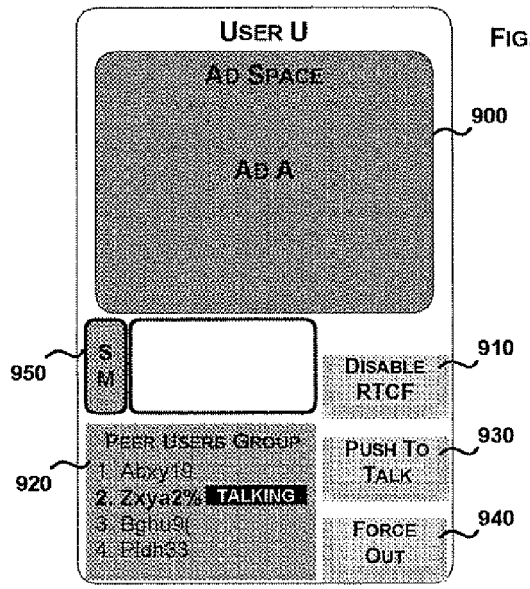

FIG. 9: AN ILLUSTRATIVE RTCF SESSION

FIG. 10: AN APPROACH FOR RTCF SESSION MANAGEMENT

RTCF

OBJECTIVE:
  RTCF STANDS FOR REAL-TIME CONVERSATIONAL FEEDBACK; RTCF HELPS USERS IN OBTAINING FEEDBACK FROM A PEER GROUP ASSOCIATED WITH AN AD AND IN OBTAINING MORE RELEVANT AND EXPERIENCE BASED FEEDBACK ON THE PRODUCT RELATED TO THE AD;
  THE ENTIRE RTCF SESSION ENSURES PROTECTION OF PRIVACY BY SUPPORTING ANONYMITY;
  A USER OBTAINING THE FEEDBACK HAS THE FLEXIBILITY TO TURN-OFF RTCF SESSION AND FORCE OUT A USER WHO IS POSSIBLY A SPAMMER;
  SYSTEM MODERATOR, SM, HAS A PREROGATIVE TO CLOSE ANY COMMUNICATION CHANNEL BASED ON POLICIES;

ON CLICKING ON AD A BY USER U,
  DISPLAY AD A IN AD SPACE;
  INVITE U TO CLICK ON ENABLE RTCF BUTTON (OPTIONAL);
  IF U CLICKS ON ENABLE RTCF BUTTON,
    CHANGE BUTTON CAPTION TO DISABLE RTCF;
    SELECT A PRE-DEFINED NUMBER OF PEER USERS FROM PUGA LIST;
    SEND A TEXT MESSAGE TO EACH OF THE SELECTED USERS FOR THEIR WILLINGNESS TO PARTICIPATE IN AN RTCF SESSION WITH RESPECT TO AD A;
    GENERATE A RANDOM IDENTITY FOR EACH OF THE ACCEPTED USERS; NOTE THAT THE IDENTITY IS SESSION-SPECIFIC;
    DEFINE PTT-USERS AS PEER USERS AND U;
    ON ACCEPTANCE, UPDATE RTCF UNITS OF EACH OF THE PEER USERS;
    UPDATE THE VARIOUS COUNTS FOR EACH OF THE SELECTED USERS;
    DISPLAY THE RANDOM IDENTITIES ON THE USER MOBILE SCREEN AND ENABLE PUSH TO TALK BUTTON;

RTCF (CONTD.)

ON PUSH TO TALK BY A USER X (U OR ANY FROM PEER USER GROUP),
   DISPLAY PUSH TO TALK BUTTON FOR X;
   IF PTTQ IS NOT EMPTY,
      PUT RANDOM USER ID TO PTTQ;
      RETURN;
   ENABLE ANONYMOUS VOICE COMMUNICATION FOR X;

ON COMPLETION OF AN ANONYMOUS VOICE CONVERSATION,
   IF PTTQ IS NOT EMPTY,
      REMOVE NEXT USER X FROM TOP OF PTTQ;
      ENABLE ANONYMOUS VOICE COMMUNICATION FOR X;

ENABLE ANONYMOUS VOICE COMMUNICATION FOR USER X,
   STEP 1: CHANGE PUSH TO TALK BUTTON CAPTION TO OVER;
        OPEN COMMUNICATION CHANNEL;
   STEP 2: RECEIVE VOICE SIGNALS S FROM X
   STEP 3: CONVERT S TO SYNTHETIC SIGNALS SS;
   STEP 4: SEND SS TO ALL PTT-USES EXCEPT X;
   STEP 5: REPEAT STEPS 2 – 4 UNTIL OVER BUTTON IS PUSHED
        OR A PROLONGED SILENCE IS RECEIVED OR FORCEOUT IS PRESSED BY U
        OR X HANGS UP;
   STEP 6: IF OVER BUTTON IS PUSHED OR A PROLONGED SILENCE IS RECEIVED,
        CHANGE PUSH TO TALK BUTTON CAPTION TO PUSH TO TALK;
        CLOSE COMMUNICATION CHANNEL;
   STEP 7: IF X IS FORCED OUT, SEND THANKS MESSAGE TO X;
        CLOSE COMMUNICATION CHANNEL; UPDATE DATABASE APPROPRIATELY;
   STEP 8: IF X HANGS UP OR A PROLONGED SILENCE IS RECEIVED,
        SEND THANKS MESSAGE TO X; CLOSE COMMUNICATION CHANNEL;
        UPDATE DATABASE APPROPRIATELY; UPDATE RTCF UNITS;

ON USER U HANGS UP,
   FOR EACH PEER USER,
      SEND THANKS MESSAGE;
      CLOSE THE COMMUNICATION CHANNEL
      UPDATE THE VARIOUS COUNTERS;
      UPDATE THE RTCF UNITS;
   UPDATE DATABASE ASSOCIATED WITH USER U;
   UPDATE THE RTCF UNITS ASSOCIATED WITH USER U;

FIG. 10A: AN APPROACH FOR RTCF SESSION MANAGEMENT (CONTD.)

RTCF (CONTD.)

ON USER U INITIATING A PURCHASE OF PRODUCT P ASSOCIATED WITH AD A:
   FOR EACH PEER USER,
      SEND THANKS MESSAGE;
      CLOSE THE COMMUNICATION CHANNEL
      UPDATE THE VARIOUS COUNTERS;
      UPDATE THE RTCF UNITS;
   UPDATE DATABASE ASSOCIATED WITH USER U;
   UPDATE THE RTCF UNITS ASSOCIATED WITH USER U;
   UPDATE PRODUCT BOUGHT STATUS AND NUMBER PRODUCTS BOUGHT;
   MARK AD A AS CLOSED FOR U;

SYSTEM MODERATOR:
   FOR EACH RTCF SESSION R UNDER PROGRESS,
      SEND INFORMATORY AND SUGGESTIVE TEXT MESSAGE(S) TO USER U;
      OBTAIN PUGGYS ASSOCIATED WITH R;
      OBTAIN PUGGY-RELATED INFORMATION SUCH AS DURATION OF COMMUNICATION AND NUMBER OF PUSHES OF PUSH TO TALK BUTTON;
      FORCE CLOSE A PUGGY IF REQUIRED BASED ON POLICIES;

FIG. 10B: AN APPROACH FOR RTCF SESSION MANAGEMENT (CONTD.)

SYSTEM AND METHOD FOR SUPPORTING PEER INTERACTIONS

FIELD OF THE INVENTION

The present invention relates to peer interactions in general, more particularly, peer interactions through mobile phones. Still more particularly, the present invention is related to a system and method for supporting peer interactions in a particular domain such as classified ads.

BACKGROUND OF THE INVENTION

The business models involved in classified ads are based on click-based revenue and sale-based revenue. In a click based revenue, the service provider providing classified ads service earns revenue for every click on an ad from the sponsor of the ad. On the other hand, in a sale-based revenue, the provider earns whenever a user buys the product endorsed by an ad from the classified ads portal. Obviously, returns are higher in the sale based revenue model and in order to reduce risk due to non-sale, both the models are combined and adapted in practice.

When a user clicks on a classified ad that is a part of a classified ads portal, various kinds of promotional information can be provided to the user. These kinds of promotional information are largely provided by the ad sponsors. Typically, the information provided by the sponsors is positively positioned with respect to the products of the sponsors. Hence, there is a bit of hesitation in accepting all of the information provided by the sponsors. In order to reduce the bias and enhancing of the utility value for the users, additional information sources need to be identified. One of the major issues regarding these additional information sources is the handling of spam sources. A way of identifying of these additional sources is to look for product champions within a user community and can be based on the information such as the following: People who own the product, Duration of ownership, Enquiries made, Complaints made, Enquiry duration, User feedback, Reaction to promotional offers, Products of same brand bought, User location, and General information such as likes and dislikes. The behavior of a typical user could be categorized along the following phases: Buy-Phase, Use-Phase, Advertise/Deny-Phase, and is summarized in the table below:

| Buy Phase | Use Phase | Advertise/Deny Phase |
|---|---|---|
| Buys product | Gives feedback | Willingness to participate in voice campaign |
| Buys multiple products | Entertains sales calls | Willingness to participate in chat campaign |
| Buys when there is a discount | Long duration usage | Willingness to participate in long duration campaign |
| Buys at premium | Short duration usage | Willingness to participate in short duration campaign |
| Buys same brand | Buys accessories | Positive participation during campaign |
| Buys same brand | Long duration complaints | Negative participation during campaign |
| Buys same brand | Short duration complaints | Consistency in participation |

Information similar to the one contained in the above table is used in identifying the potential users who could provide useful information to the other peers.

DESCRIPTION OF RELATED ART

U.S. Pat. No. 7,159,784 to Lapstun; Paul (Balmain, AU), Lapstun; Jacqueline Anne (Balmain, AU), Silverbrook; Kia (Balmain, AU) for "Method and system for searching classified advertising" (issued on Jan. 9, 2007 and assigned to Silverbrook Research Pty Ltd (Balmain, AU)) describes methods and systems that relate to listing classified advertising via interface surfaces printed with information and coded data. The coded data, encoded visibly or invisibly, may be queried by an appropriate sensing device. The sensing device communicates with a computer system. Together, the interface surfaces, sensing device and computer system are capable of effecting classified listing search transactions over a network.

U.S. Pat. No. 7,143,075 to Chickering; David Maxwell (Bellevue, Wash.), Heckerman; David E. (Bellevue, Wash.) for "Automated web-based targeted advertising with quotas" (issued on Nov. 28, 2006 and assigned to Microsoft Corporation (Redmond, Wash.)) describes systems and methods that can be used for targeted advertising. The system determines where to present impressions, such as advertisements, to maximize an expected utility subject to one or more constraints, which can include quotas and minimum utilities for groups of one or more impression.

U.S. Pat. No. 20080040216 by Dellovo; Danielle F.; (North Andover, Mass.) entitled "Systems, methods, and apparatuses for advertisement targeting/distribution" (filed on May 14, 2007) describes apparatuses, systems and methods for selecting a base data entry for distribution with a content provider's requested content. The system processes the advertisement request to extract content provider distribution parameters and/or web user data characteristics, if they exist. This data may be processed to create an initial a pool of potential base data entries, one (or more) of which will be distributed to a content provider.

U.S. Pat. App. No. 20070099701 by Simon; Daniel; (San Diego, Calif.); Westling; Mark Ford; (Chevy Chase, Md.); Wherry; Phillip; (Vienna, Va.) entitled "Method and system to facilitate interaction between and content delivery to users of a wireless communications network" (filed on Apr. 7, 2006) describes a system and method of creating affinity groups of portable communication device users, and distributing targeted content to said users.

U.S. Pat. App. No. 20070067405 by Eliovson; Joshua M.; Roseland, N.J.) entitled "Moderated anonymous forum" (filed on Sep. 20, 2006) describes a moderated forum that provides an arena for anonymous public discussions in and among a given on-line or virtual community as well as discussions between separate on-line or virtual communities.

"Comprehensive Analysis of Web Privacy and Anonymous Web Browsers: Are Next Generation Services Based on Collaborative Filtering?" by Gulyás, G., Schulcz, R., and Imre, S. (appeared in the Proceedings of the Second Workshop on Sustaining Privacy in Autonomous Collaborative Environments (SPACE 2008), Jun. 17, 2008) presents main web privacy issues, complex preventive solutions, and anonymous web browsers, in several aspects including a comprehensive taxonomy. Also, suggests a next generation anonymous browser scheme based on collaborative filtering concerning issues of semantic web.

"A Profile Anonymization Model for Privacy in a Personalized Location Based Service Environment" by Shin, H., Atluri, V., and Vaidya, J. (appeared in the Proceedings of the Ninth International Conference on Mobile Data Management (MDM 2008), Apr. 27-30, 2008) addresses the problem of privacy preservation via anonymization that guarantees anonymity even when profiles of mobile users are known to untrusted entities.

"Towards Anonymous Mobile Community Services" by Demestichas, K. P., Adamopoulou, E. F., Markoulidakis, J. G., and Theologou, M. E. (appeared in Journal of Network and Computer Applications, April 2008 (available online at http://www.sciencedirect.com/science/journal/10848045) describes an innovative concept of anonymous mobile community services and thoroughly defines and describes a robust platform targeted for their deployment.

"Introducing Anonymous Real-Time Mobile Community Services" by Adamopoulou, E., Demestichas, K., Dessiniotis, C., Markoulidakis, J., and Theologou, M. (appeared in the Proceedings of the 16th IST Mobile and Wireless Communications Summit, 2007, 1-5 Jul. 2007) analyzes the concept of anonymous real-time mobile community services that enables the real-time collection of information residing in a community of mobile terminals, which can then be processed and delivered to a service requesting terminal.

"A secure and privacy-preserving web banner system for targeted advertising" by Claessens, J., D iaz, C., Faustinelli, R., and and Preneel, B. (appeared as COSIC internal report, January, 2003) proposes a solution for privacy-preserving targeted advertising through web banners and the solution allows users to make a balance between the exposure of their privacy and the personalization of advertisements.

The known systems do not address the various issues related to the enabling of peer support in an anonymous manner in helping users to quickly take decisions while browsing classified ads. The present invention provides a system and method to enable selecting of right ads for displaying to the users, selecting of right peer users for providing additional information, and supporting of anonymous peer interactions.

SUMMARY OF THE INVENTION

The primary objective of the invention is to enable selecting of right content for to be displayed on a user's mobile phone, selecting of right peers, and facilitating of anonymous peer interactions.

One aspect of the system is to perform user grouping in order to identify peer user groups.

Another aspect of the invention is to perform ad grouping in three different ways, namely, generic ad grouping, meta ad grouping based on meta-descriptions, and custom ad grouping based on a user and an ad.

Yet another aspect of the invention is to display the ads in a radial manner based on a user grouping and a plurality of ad groupings.

Another aspect of the invention is to form ad specific peer user groups.

Yet another aspect of the invention is to facilitate real time conversational feedback to support anonymous peer interactions.

BRIEF DESCRIPTION OF THE DRAWINGS

FIG. 1 depicts a typical Mobile/Classified Ad Scenario.
FIG. 2 depicts an overview of Anonymous Peer Support System (APSS).
FIG. 3 depicts a brief description of Ads and Users.
FIG. 4 depicts an approach for User Group Generation.
FIG. 5 provides an approach for Ad Group Generation.
FIG. 5a provides another approach for Ad Group Generation.
FIG. 5b provides an additional approach for Ad Group Generation.
FIG. 6 provides an approach for Ad Display.
FIG. 6a provides an additional approach for Ad Display.
FIG. 7 provides an illustrative Ad Display.
FIG. 8 provides an approach for Peer User Group Generation.
FIG. 9 depicts an illustrative Real Time Conversational Feedback (RTCF) Session.
FIG. 10 provides an approach for RTCF Session Management.
FIG. 10a provides additional details related to RTCF Session Management.
FIG. 10b provides some more details related to RTCF Session Management.

DETAILED DESCRIPTION OF THE PREFERRED EMBODIMENTS

Consider a scenario of a mobile user accessing a web portal of classified ads. The user's intent is to browse the portal with one or more things in mind, locate the information about them, discuss offline with friends and colleagues, and take a buy/no-buy decision. The increase in m-commerce transactions has lead to the buying of products through classified ads and auction portals. In order to reduce the time cycle involved in decision making, especially if the access is through a mobile phone, it is essential to provide right information and right support system for decision making. As users login into a portal, there is an opportunity to collect the information about the users' profile and this would help in moving towards the objective of cycle time reduction. In a situation where a particular user has logged in several times to know about a product though the ad in a classified ads portal, the subsequent login gives an opportunity to restructure the display so that what is mostly of interest appear sooner and less interesting ads appear later. Further, if a particular peer user group is identified keeping in mind the user and the product of interest, the user could interact with the group to obtain more information that could help in decision making. The supporting of peer user group interactions requires (a) the identification of the right puggys (the peer user group members) and (b) the protection of the privacy of the puggys and the user who is seeking the support information. These two aspects together ensure a free flow of right information to help in decision making.

FIG. 1 depicts a typical Mobile/Classified Ad Scenario. A mobile user (100) interacts with a classified ad server (110) in order to browse the ads using the mobile phone. In order to be able to browse the ads, the user logs in into the system, and the system displays the ads obtained from the database (120). Anonymous Peer Support System (130) helps in selecting and displaying of the right ads on the mobile phone of the user, identification of right peers (140 and 150) (who had logged in into system several times in the past in order to browse the ads), and facilitates anonymous real time conversation among the puggys. This real time conversational feedback (RTCF) helps in obtaining the adequate information about the product of interest. Further, some of the puggys (150) can be sponsor sales personnel (also called as corporate sales (CS) staff) of a company (160) so that any clarifications regarding the product can also be obtained.

FIG. 2 depicts an overview of Anonymous Peer Support System (APSS). The APSS system is part of a classified ad system (200) uses several databases (210) such as Users database, Ad database, and other support databases. Typically, the classified ad system largely manages classified ads (220), users (225), mobile phone interactions (230), and m-commerce transactions (235). One of the important modules of the classified ad system is APSS (245). The important modules of APSS are as follows: User-Ad Grouping (250)—This module analyzes the user and ad data in order to appropriately group them so that the right ads can be selected for a particular user; PUG-List Generation (255)—Peer user group (PUG) lists are formed for each ad so that the right puggys can be selected when a particular user needs more information on a particular product; Ad Display (260)—As users access the portal through their mobile phones, this module helps in organizing the selected content for display on any specific mobile phone; Multi-Party Conferencing (Push to Talk PTT) (265)—This module helps in supporting peer interactions through PTT supporting multiple simultaneous multi-party conference; Anonymity Support (270)—This module support anonymous peer interactions thereby enhancing privacy protection; RTCF-Units Management (275)—RTCF units are awarded to puggys for participating in RTCF sessions and this can be exchanged for obtaining the various kinds of rewards; RTCF Session Management (280)—This module manages the various simultaneous RTCF sessions that are in progress and in particular ensures that no single user is excessively loaded from providing support point of view; and System Moderator (SM) (285)—This module helps in monitoring the RTCF sessions and providing of appropriate text messages to the users and puggys.

FIG. 3 depicts a brief description of Ads and Users.
Ad Description is as follows:
Each ad is about a product or brand;
Ads are described using a set of key-atomic concepts;
Each ad has details about who all have shown interest through clicking;
Let A be an ad; DA is a set of key-atomic concepts providing the description of A;
Let SUA be a set of users who have shown interest in A;
Let CS be a set of corporate sales staff information for each ad for participating in RTCF sessions;
User Description is as follows:
Users visit the Classified Ads portal in order to know about the products being advertised;
Users visit the portal several times, click on multiple ads multiple times;
Users also participate in several real-time conversational feedback sessions;
User data includes the following:
  With respect to an ad A
    Number of clicks (NC);
    Frequency of Clicks (FC); Note that FC is related to Time interval between clicks;
    Number of RTCFs Initiated (NI);
    Number of RTCFs Participated (NP);
    Total Participation Time (TT);
    Bought status (BS);
  Number of Products Bought (NB);
  RTCF Units (RU);
  Reward Points;
  Number of Forced Outs (FO);

FIG. 4 depicts an approach for User Group Generation. The objective of User Grouping is to create user groups based on their click behavior with respect to ads;
Input: SU—a set of users; Output: GSU—a set of groups of users;
For each user U in SU,
  Obtain UA, the set of ads clicked by U;
For each user U1 in SU,
  Determine a group G in GSU whose distance with U is minimum as compared with the other groups in GSU and is less than a pre-defined threshold;
  if such a group G can be found, make U1 a part of G and update G;
  Otherwise, create a new group G, make U1 a part of G, make G a part of GSU, and update G;
A way to Update G with U would be to add UA to GA wherein G is a set of users and the associated GA is the set of ads based on users in G;
A way to measure distance between U and G would be based on the intersection between UA and GA;

FIG. 5 provides an approach for Ad Group Generation. The generic Ad Grouping is based on users' click information. The objective is to create ad groups that are used to display the ads to a first time user or to a user who has no open ads (an open ad is an ad that has been clicked by a user and has not yet been closed). Note that a user clicks on an ad several times before taking a buy/no-buy decision. An ad is said to be open for a particular user if the user has clicked on the same at least once. This ad would remain open until the product related to the ad is bought by the user, the user explicitly informs the system about no-buy decision, or there is no further activity with that ad for a prolonged period of time. Then, the ad is marked as closed with respect to that user. Typically, the closed ads are not included while making a list of ads for to be displayed to the user.

Input: SA—a set of ads; Output: GSA—a set of groups of ads (generic ad groups);
Step 1: Select an Ad Ai from SA; Set SAi' EMPTY;
Step 2: Let UAi be the set of users who have shown interest in Ai;
  Typically, "shown interest" is based on click pattern analysis wherein, the users' clicks related to an ad are analyzed for the aspects such as number of clicks and frequency of clicks;
Step 3. For each user U in UAi,
  Obtain ads clicked by U;
  Filter these ads based on frequency of clicks to identify SA1';
  If SAi' is EMPTY, Set SAi'=SA1';
  Else SAi'=Intersection of SAi' and SA1';
Step 4: Make Ai part of SAi'; Make SAi' a part of GSA; Remove SAi' from SA;
Step 5: Repeat from Step 1 until SA is EMPTY;

FIG. 5a provides another approach for Ad Group Generation. This additional approach is based on meta-description of ads to generate meta ad groups. Each ad is provided with a meta-description, say in terms of key-atomic concepts. The objective is to group ads based on their meta-description so as to be able to identify similar ads;
Input: SA—a set of ads; Output: DGSA—a set of meta ad groups
Step 1: Select an Ad A from SA;
Step 2: Determine a group G in DGSA whose distance with A is minimum as compared with the other groups in DGSA and is less than a pre-defined threshold;
Step 3: If such a group can be found, make A part of the G and update G;
Step 4: Otherwise, create a new group G with A as its element, make G a part of DGSA, and update G;
Step 5: Repeat from Step 1 until all elements of SA are selected;
A way to update G with A would be obtain the meta-description of A and Meta-description of G, and combine them based on term-frequency analysis;

A way to compute distance between A and G would be obtain the intersection of the meta-description of A and meta-description of G;

FIG. 5b provides an additional approach for Ad Group Generation. This ad grouping is based on a particular user U and a particular ad A to generate custom ad groups. The objective is to identify a set of ads based on a user and an ad.

Input: User U and Ad A clicked by U;
Output: Custom-Specific Ad Grouping;
Obtain the set of ads SSA that are similar to A; SSA belongs to DGSA;
Obtain the set of users SSU that are similar to U; SSU belongs to GSU;
Obtain the set of ads SOA that are also clicked by U;
SSA provides ads that are most similar to A;
Order SSA on hits and recency;
SSU provides users that are most similar to U;
For each user U in SU,
Obtain the most recent and most clicked ads related to U;
Make these ads a part of SSUA;
Order SSUA on hits and recency;
Order SOA based on hits and recency;

FIG. 6 provides an approach for Ad Display. The objective is to prepare a list of most relevant ads for a given user and display them in the most appropriate manner on the user's mobile phone. There are three kinds of users: A user with one or more open ads; a user with no open ads; and a first time user. It is observed that each kind of user requires a distinct approach for selecting the most relevant ads.

Ad Display on User Login;
Input-Logged in User U; Output-Display structure of Ads
Case: U with Open Ads
Let A be the ad last clicked by U that is still open;
Obtain the sets SSA, SSUA, and SOA;
Obtain the screen dimension;
Determine R the number of radial structures possible;
Put A at the center of the screen;
Remove ads that are closed with respect to U from SSA, SSUA, and SOA;
For each radial structure until R,
    Divide the next radial surface into three portions, RA, RUA, and ROA, based on the relative sizes of SSA, SSUA, and SOA;
    Based on the size of RA, select top ads from SSA; and populate RA;
    Based on the size of RUA, select top ads from SSUA, and populate RUA;
    Based on the size of ROA, select top ads from SOA, and populate ROA;
Display on a mobile phone using the Display Structure 1;
Case: U with no Open Ads
Based on GSU, determine the group G of U;
For each GA in GSA,
    Obtain the set of users SX who are part of ads in GA;
        Note that this is based on users who have shown interest in an ad in GA;
    Determine the overlap factor of GA based on intersection between SX and G;
Select GA with the maximum overlap factor;
Remove ads that are closed with respect to U;
Order GA on hits and recency;
Obtain the screen dimension;
Determine R the number of radial structures possible;
Select A that is at the top of GA and put A at the center of the screen;
For each radial structure until R,
    Obtain the number of ads N that can be displayed;
    Select N ads from GA and Populate RA;
Display on a mobile phone using the Display Structure 2;
Case: U is a first time user
For each GA in GSA,
    Determine a Popularity factor based on hits and recency of ads in GA;
Select GA with the maximum popularity factor;
Order GA on hits and recency;
Obtain the screen dimension;
Determine R the number of radial structures possible;
Select A that is at the top of GA and put A at the center of the screen;
For each radial structure until R,
    Obtain the number of ads N that can be display;
    Select N ads from GA and Populate RA;
Display on a mobile phone using the Display Structure 3;

FIG. 6a provides an additional approach for Ad Display. When the selected relevant ads get scrolled out, it is necessary to select further ads. This further selection is independent of the three kinds of users discussed with respect to FIG. 6.

For each GA in GSA,
    Determine a Popularity factor based on hits and recency of ads in GA;
For each GA obtained in the order of Popularity Factor
Remove ads that are either closed with respect to U or already displayed;
Make the remaining ads a part of the Reserve Display Structure;
Depending on the scroll direction,
Remove an appropriate radial structure from display;
Reposition and display the remaining radial structures;
Fill the next radial structure using either Display Structure 1, Display Structure 2, Display Structure 3, or Reserve Display Structure;
Display the ads from the next radial structure;

FIG. 7 provides an illustrative Ad Display. For a user with open ads, and a clicked ad, there is an opportunity to obtain the ads from multiple perspectives: (a) one perspective is to obtain ads that are similar to A and these ads get displayed along a particular radial surface (700); (b) the second perspective is to obtain ads that are most clicked by the user (710); and (c) finally, the third perspective is to obtain ads that are most clicked by users who are similar to the user (720). Observe that the ads are displayed in a radial manner (730), and depending on the scroll direction, the screen is flushed of ads along a specific radial surface and displayed with further ads along a specific radial surface (740).

FIG. 8 provides an approach for Peer User Group Generation. PUG-List (Peer User Group list) is formed specifically for each ad so that there is a greater success rate of providing the right information during RTCF sessions. The objective is to create, for each ad, a peer user group who could provide support for helping a user to take a decision on a product endorsed by ad A; The peer user group members are also called as puggys.

Input: An Ad A; Output: PUGa—List of users related to A;
Obtain for each user U the following:
With respect to A, obtain Number of clicks (NC), Frequency of Clicks (FC), Number of RTCFs Initiated (NI), Number of RTCFs Participated (NP), Total Participation Time (TT); Note that FC is related to Time interval between clicks;
Obtain Number of Products Bought (NB), Bought status (BS) with respect to A, RTCF Units (RU), Reward Points, and Number of Forced Outs (FO);

Obtain Min and Max bounds on PUGa;
Obtain Number of CS with respect to A;
Let W1 be the weight associated with NC, W2 with FC, W3 in NI, W4 with NP, W5 with TT, W6 with NB, and W7 with RU;
Across all users, obtain Max-NC and Min-NC, Max-FC and Min-FC, Max-Ni and Min-NI, Max-NP and Min-NP, Max-TT and Min-TT, Max-NB and Min-NB, Max-RU and Min-RU;
For each User U, Compute Ur as $(W1*(NC-\text{Min-}NC)/(\text{Max-}NC-\text{Min-}NC))+(W2*(FC-\text{Min-}FC)/(\text{Max-}FC-\text{Min-}FC))+(W3*(NI-\text{Min-}NI)/(\text{Max-}NI-\text{Min-}NI))+(W4*(NP-\text{Min-}NP)/(\text{Max-}NP-\text{Min-}NP))+(W5*(TT-\text{Min-}TT)/(\text{Max-}TT-\text{Min-}TT))+(W6*(NB-\text{Min-}NB)/(\text{Max-}NB-\text{Min-}NB))+(W7*(RU-\text{Min-}RU)/(\text{Max-}RU-\text{Min-}RU))$;

Rank users on their rating Ur;
Select a pre-defined number of users that is less than Max, with each selected user satisfying the following:
    If Rank<a pre-defined first threshold and FO>a pre-defined threshold, User is not selected;
    If Rank<a pre-defined second threshold and BS is TRUE, User is selected;
Remaining number of users is selected from the top of the ranked users;
If number of users is <Min, then add randomly selected users;
Depending on the policy, add appropriate number of CS staff, FIG. 9 depicts an illustrative RTCF Session. Note that to begin with, on display of ad A (900) that could be a text body, an image, or a video, RTCF Button (910) displays "Enable RTCF" inviting the user U to initiate an RTCF session if there is a need. On clicking of the RTCF button, the caption gets changed to "Disable RTCF" and appropriate puggys are selected from the PUG-list associated with ad A and displayed (920). Push to Talk (930) enables multi-party conversation and Force Out (940) button gives the control to the user to force out spammers. System Moderator (SM) (950) displays the text message that could be both informative and suggestive. Further SM enforces the policies in order to avoid aspects such as too lengthy RTCF sessions.

FIG. 10 provides an approach for RTCF Session Management Real-time conversational feedback (RTCF) sessions help a user by providing both formal and informal feedback and ensure that the user has all the necessary information to make a buy/no-buy decision. This helps in reducing the decision making cycle time and the makes the classified ads portal more effective. Note that RTCF sessions help users in obtaining feedback from a peer group associated with an ad and in obtaining more relevant and experience based feedback on the product related to the ad. The entire RTCF session ensures protection of privacy by supporting anonymity. A user obtaining the feedback has the flexibility to turn-off RTCF session and force out a user who is possibly a spammer. System Moderator, SM, has a prerogative to close any communication channel based on policies.

RTCF:
On Clicking on Ad A by User U,
Display ad A in Ad Space;
Invite U to click on Enable RTCF button (Optional);
If U clicks on Enable RTCF button,
    Change Button caption to Disable RTCF;
    Select a pre-defined number of peer users from PUGa list;
    Send a text message to each of the selected users for their willingness to participate in an RTCF session with respect to ad A;
    Generate a random identity for each of the accepted users; Note that the identity is session-specific;
    Define PTT-Users as Peer Users and U;
    On acceptance, update RTCF Units of each of the peer users;
    Update the various counts for each of the selected users;
    Display the random identifies on the user mobile screen and enable Push To Talk Button;

FIG. 10a provides additional details related to RTCF Session Management.

RTCF: (Contd.)
On Push To Talk by a user X (U or any from Peer User Group),
    Display Push To Talk button for X;
    If PTTQ is not empty,
        Put Random User ID to PTTQ;
        Return;
    Enable Anonymous voice communication for X;
    On completion of an anonymous voice conversation,
    If PTTQ is not empty,
        Remove next user X from top of PTTQ;
        Enable Anonymous Voice Communication for X;
    Enable Anonymous Voice Communication for user X,
    Step 1. Change Push To Talk button caption to OVER;
        Open communication channel;
    Step 2: Receive voice signals S from X
    Step 3: Convert S to synthetic signals SS;
    Step 4: Send SS to all PTT-Uses except X;
    Step 5: Repeat Steps 2-4 until OVER button is pushed or a prolonged silence is received or ForceOut is pressed by U or X hangs up;
    Step 6: If OVER button is pushed or a prolonged silence is received,
        Change Push To Talk button caption to Push To Talk;
        Close communication channel;
    Step 7: If X is Forced Out, Send Thanks message to X;
        Close communication channel; Update database appropriately;
    Step 8: If X hangs up or a prolonged silence is received,
        Send Thanks message to X; Close communication channel;
        Update database appropriately; Update RTCF Units;

A way to achieve Step 2 and 3 would be to use an automatic speech recognizer to generate textual equivalent of voice signals S, and subsequently use a text to speech synthesizer with respect to the generated text data to obtain synthetic signals SS that is equivalent of the voice signals S. This is based on the observation that the anonymous peer support is based on speech communication.

On User U hangs up,
For each peer user,
    Send Thanks message,
    Close the communication channel
    Update the various counters;
    Update the RTCF Units;
Update database associated with user U;
Update the RTCF Units associated with user U;

FIG. 10b provides some more details related to RTCF Session Management.

On User U initiating a purchase of Product P associated with ad A:
For each peer user,
    Send Thanks message;
    Close the communication channel Update the various counters;
Update the RTCF Units;
Update database associated with user U;
Update the RTCF Units associated with user U;
Update Product Bought status and Number Products Bought;
Mark ad A as CLOSED for U;
System Moderator:
For each RTCF session R under progress,
Send informatory and suggestive text message(s) to user U;
Obtain Puggys associated with R;
Obtain puggy-related information such as duration of communication and number of pushes of Push To Talk button;
Force close a puggy if required based on policies;

Thus, a system and method for anonymous peer support system is disclosed. Although the present invention has been described particularly with reference to the figures, it will be apparent to one of the ordinary skill in the art that the present invention may appear in any number of systems that supports providing of right information, identification of right peer group, and facilitating of anonymous peer interactions. It is further contemplated that many changes and modifications may be made by one of ordinary skill in the art without departing from the spirit and scope of the present invention.

What is claimed is:

1. A computer-implemented method for supporting a user of a plurality of users browsing a classified ads portal through a mobile phone in order to help reduce a decision cycle time with respect to a targeted advertisement of a plurality of advertisements that excludes a plurality of closed advertisements based on a plurality of peer users of said user, a plurality of radial structures, and a plurality of real time conversational feedback sessions, wherein said plurality of advertisements is associated with said classified ads portal, each of said plurality of peer users is a particular user of said plurality of users, said plurality of radial surface 1 ads is a part of said plurality of advertisements, said plurality of radial surface 2 ads is a part of said plurality of advertisements, and said plurality of radial surface 3 ads is a part of said plurality of advertisements, the method performed on a computer system comprising at least one processor, said method comprising:
  determining, with at least one processor, said plurality of closed advertisements, wherein an ad of said plurality of advertisements has not been clicked by said user for a period of time that exceeds a pre-defined threshold and said ad is a part of said plurality of closed advertisements;
  determining, with at least one processor, said plurality of radial surface 1 ads based on said plurality of advertisements and said targeted advertisement;
  populating, with at least one processor, said plurality of radial structures using said plurality of radial surface 1 ads, said plurality of radial surface 2 ads, and said plurality of radial surface 3 ads;
  displaying, with at least one processor, said plurality of radial surface 1 ads, said plurality of radial surface 2 ads, said plurality of radial surface 3 ads on said mobile phone using said plurality of radial structures;
  determining, with at least one processor, a number of clicks, a frequency of clicks, a number of initiated real time conversational feedback sessions, a number of participated real time conversational feedback sessions, a total of real time conversational feedback participation time, and a bought status of a product based on said targeted advertisement and a user of said plurality of users;
  determining, with at least one processor, a number of products bought, a number of real time conversational feedback units, and a number of forced outs based on said user;
  determining, with at least one processor, a weight 1 associated with said number of clicks, a weight 2 associated with said frequency of clicks, a weight 3 associated with said number of initiated real time conversational feedback sessions, a weight 4 associated with said number of participated real time conversational feedback sessions, a weight 5 associated with said total of real time conversational feedback participation time, a weight 6 associated with said number of products bought, and a weight 7 associated with said number of real time conversational feedback units;
  determining, with at least one processor, a maximum 1 and a minimum 1 associated with said number of clicks based on said plurality of users;
  determining, with at least one processor, a maximum 2 and a minimum 2 associated with said frequency of clicks based on said plurality of users;
  determining, with at least one processor, a maximum 3 and a minimum 3 associated with said number of initiated real time conversational feedback sessions based on said plurality of users;
  determining, with at least one processor, a maximum 4 and a minimum 4 associated with said number of participated real time conversational feedback sessions based on said plurality of users;
  determining, with at least one processor, a maximum 5 and a minimum 5 associated with said total of real time conversational feedback participation time based on said plurality of users;
  determining, with at least one processor, a maximum 6 and a minimum 6 associated with said number of products bought based on said plurality of users;
  determining, with at least one processor, a maximum 7 and a minimum 7 associated with said number of real time conversational feedback units based on said plurality of users;
  computing, with at least one processor, a rating of a plurality of ratings of said user based on said weight 1, said maximum 1, said minimum 1, and said number of clicks, said weight 2, said maximum 2, said minimum 2, and said frequency of clicks, said weight 3, said maximum 3, said minimum 3, and said number of initiated real time conversational feedback sessions, said weight 4, said maximum 4, said minimum 4, and said number of participated real time conversational feedback sessions, said weight 5, said maximum 5, said minimum 5, and said total of real time conversational feedback participation time, said weight 6, said maximum 6, said minimum 6, and said number of products bought and said weight 7, said maximum 7, said minimum 7, and said number of real time conversational feedback units;
  ranking, with at least one processor, said plurality of users based on said plurality of ratings resulting in a plurality of ranked users;
  removing, with at least one processor, a ranked user of said plurality of ranked users from said plurality of ranked users if a rank associated with said ranked user is less than a pre-defined first threshold and a number of force outs associated with said ranked user is greater than a pre-defined threshold;

selecting, with at least one processor, a pre-defined number of users from said plurality of ranked users as said plurality of peer users, wherein a rank associated with a user of said plurality of ranked users is less than a pre-defined second threshold and a bought status associated with said user is true;

updating, with at least one processor, said plurality of peer users based on said pre-defined number of users from the top of said plurality of ranked users;

determining, with at least one processor, said plurality of real time conversational feedback sessions, wherein each real time conversational feedback session of said plurality of real time conversational feedback sessions is associated with a user of said plurality of peer users and anonymous peer interaction of a plurality of anonymous peer interactions with said plurality of peer users;

determining, with at least one processor, a real time conversational feedback session of said plurality of real time feedback sessions;

sending, with at least one processor, a plurality of text messages to a user of said plurality of peer users, wherein said user is associated with said real time conversational feedback session;

determining, with at least one processor, a plurality of participating peers associated with said real time conversational feedback session;

determining, with at least one processor, a peer user related information associated with a peer user of said plurality of participating peers, wherein said peer user related information comprises a duration of communication and a number of Push To Talk button pushes;

sending, with at least one processor, a thanks message to said peer user based on said peer user related information and a plurality of policies associated with said classified ads portal;

receiving, with at least one processor, a plurality of voice signals from a peer mobile phone of a peer user of said plurality of participating peers;

converting, with at least one processor, said plurality of voice signals to a plurality of synthetic signals; and sending, with at least one processor, said plurality of synthetic signals to said mobile phone and a plurality of peer mobile phones associated said plurality of participating peers.

2. The method of claim 1, wherein said method of determining of a plurality of radial surface 1 ads further comprises:

determining of a targeted profile of said targeted advertisement;

determining of a plurality of profiles, wherein each of said plurality of profiles is associated with an ad of said plurality of advertisements;

determining of an ad of said plurality of advertisements, wherein said ad is similar to said targeted advertisement based on a profile associated with said ad and said targeted profile;

making of said ad a part of said plurality of radial surface 1 ads; and removing of said plurality of radial surface 1 ads from said plurality of advertisements.

3. The method of claim 1, wherein said method of populating further comprises:

determining of a screen dimension of said mobile phone;

determining of a number of radial structures based on said screen dimension;

determining of said plurality of radial structures based on said number of radial structures;

putting of said targeted advertisement at the center of a screen of said mobile phone;

dividing of a radial surface of a radial structure of said plurality of radial structures into a plurality of three portions;

populating of a first portion of said plurality of three portions of said radial surface based on said plurality of radial surface 1 ads;

populating of a second portion of said plurality of three portions of said radial surface based on said plurality of radial surface 2 ads; and populating of a third portion of said plurality of three portions of said radial surface based on said plurality of radial surface 3 ads.

4. The method of claim 1, wherein said method of populating further comprises:

determining of a plurality of remaining ads based on said plurality of advertisements, wherein each of said plurality of remaining ads has not been displayed based on said plurality of radial structures;

determining of a remaining ad of said plurality of remaining ads;

determining of a plurality of clicked users of said plurality of users based on a plurality of clicks by said plurality of clicked users, wherein a number of clicks on said remaining ad by each of said plurality of clicked users exceeds a pre-defined threshold;

determining of a plurality of grouped ads based on said plurality of clicked users, wherein a grouped ad of said plurality of grouped ads is a part of said plurality of remaining ads, and a number of clicks on said grouped ad by a clicked user of said plurality of clicked users exceeds a pre-defined threshold;

determining of an ad group of a plurality of generic ad groups based on said plurality of grouped ads;

determining of a popularity factor of a plurality of popularity factors associated with said ad group of said plurality of generic ad groups based on a plurality of clicks associated with said ad group;

determining of a selected ad group based on said plurality of generic ad groups and said plurality of popularity factors;

ordering of said selected ad group based on a plurality of clicks associated with each ad of said selected ad group resulting in an ordered selected ad group;

making of said ordered selected ad group a part of a plurality of reserve selected ads;

determining of a scroll direction based on an interaction by said user with said mobile phone;

determining of a plurality of radial structures associated with said mobile phone;

determining of a radial structure based on said plurality of radial structures and said scroll direction;

removing of the radial structure from said plurality of radial structures;

repositioning of said plurality of radial structures; and populating of a radial structure of said plurality of radial structures based on said plurality of ads and said plurality of reserve selected ads.

5. The method of claim 1, further comprising: dynamically forming of said plurality of peer users based on said targeted advertisement to provide opinions to the user.

6. The method of claim 1, wherein said plurality of real time conversational feedback sessions is voice-based.

* * * * *